US012778014B2

(12) United States Patent
Ortiz Cicuendez

(10) Patent No.: US 12,778,014 B2
(45) Date of Patent: Nov. 3, 2026

(54) CONTINUOUS VIBRATION DEVICE AND METHOD FOR COLLECTING FRUITS FROM TREES AND BUSHES

(71) Applicant: IANUS INGENIERIA, S.L.U., Pedro Muñoz-Ciudad Real (ES)

(72) Inventor: José Ortiz Cicuendez, Pedro Muñoz-Ciudad Real (ES)

(73) Assignee: IANUS INGENIERIA, S.L.U., Pedro Muñoz-Ciudad Real (ES)

( * ) Notice: Subject to any disclaimer, the term of this patent is extended or adjusted under 35 U.S.C. 154(b) by 306 days.

(21) Appl. No.: 18/707,186

(22) PCT Filed: Nov. 3, 2021

(86) PCT No.: PCT/ES2021/070789

§ 371 (c)(1),
(2) Date: May 3, 2024

(87) PCT Pub. No.: WO2023/079189

PCT Pub. Date: May 11, 2023

(65) Prior Publication Data

US 2025/0000027 A1 Jan. 2, 2025

(51) Int. Cl.
*A01D 46/26* (2006.01)
*A01D 46/00* (2006.01)

(52) U.S. Cl.
CPC ............ *A01D 46/26* (2013.01); *A01D 46/00* (2013.01); *A01D 2046/266* (2013.01)

(58) Field of Classification Search
CPC .................. A01D 46/26; A01D 46/264; A01D 2046/266; A01D 46/00
See application file for complete search history.

(56) References Cited

U.S. PATENT DOCUMENTS 3,229,453 A * 1/1966 Harrett .................. A01D 46/26 56/330
4,194,347 A * 3/1980 Peters .................... A01D 46/26 56/329

(Continued)

FOREIGN PATENT DOCUMENTS

CN 113228937 A 8/2021
ES 2169688 A1 7/2002
ES 2193816 A1 11/2003

(Continued)

*Primary Examiner* — Brad Harcourt
(74) *Attorney, Agent, or Firm* — ASLAN LAW, P.C.

(57) ABSTRACT

A device being made up of respective frames, mounted in parallel and facing each other on both sides of the line of trees/bushes to be harvested, in a machine or implement capable of moving astride above said line of trees/bushes. Each of said frames includes a longitudinal guide along which skids move for conveying a trolley that bears a vibration clamp, the jaws of which open and close independently depending on the location thereof relative to the closest tree, at the same time that each trolley moves alternately from a forward position relative to the movement of the machine or implement on which this device is mounted to another more rearward position, while the vibration clamp is holding a tree and is subjecting same to vibration, and returns to the forward position when the tree is beyond the possible travel of said trolley along the longitudinal guide.

11 Claims, 9 Drawing Sheets

(56) References Cited

U.S. PATENT DOCUMENTS

2002/0029551 A1 * 3/2002 Tenias Sancho ....... A01D 46/26 56/340.1
2009/0308046 A1 * 12/2009 Garrido Madorran ...................... A01D 46/26 56/340.1

FOREIGN PATENT DOCUMENTS

ES 2269007 A2 3/2007
ES 1265465 U 4/2021

* cited by examiner

Fig. 9.1
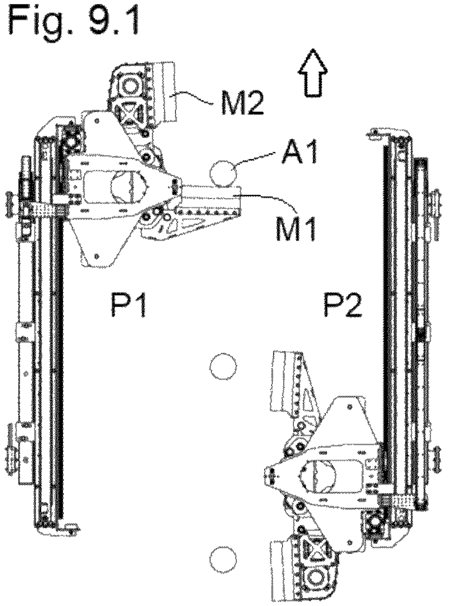
Fig. 9.2
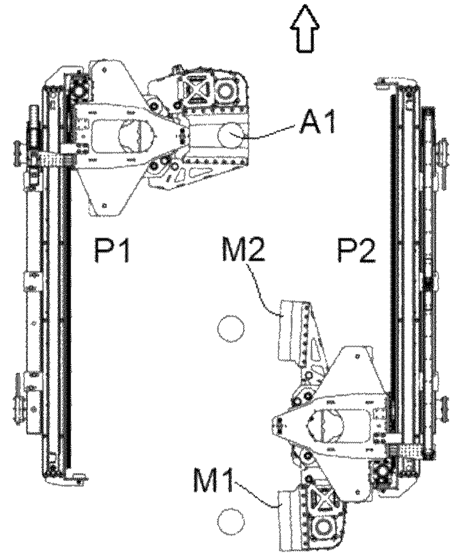
Fig. 9.3
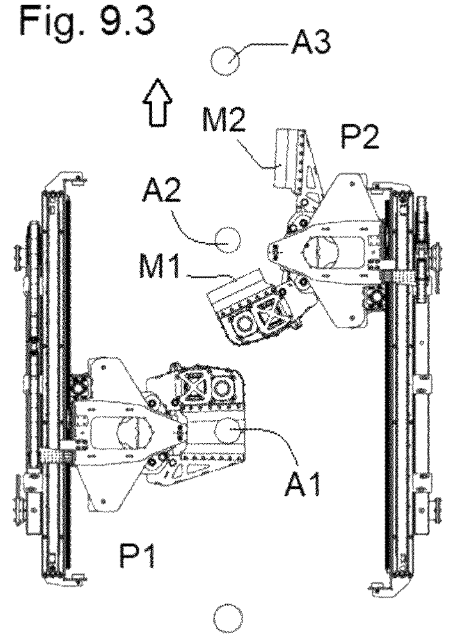
Fig. 9.4
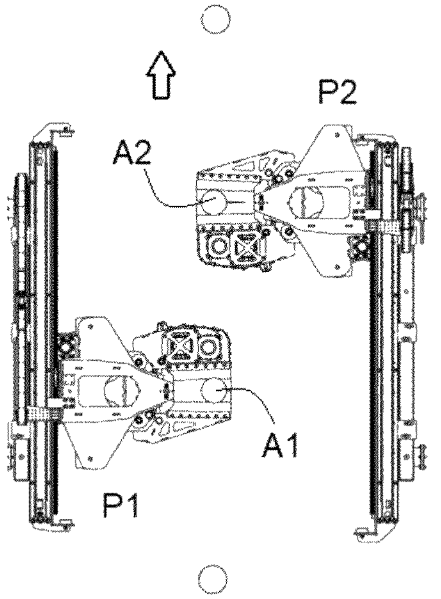

Fig. 9.5
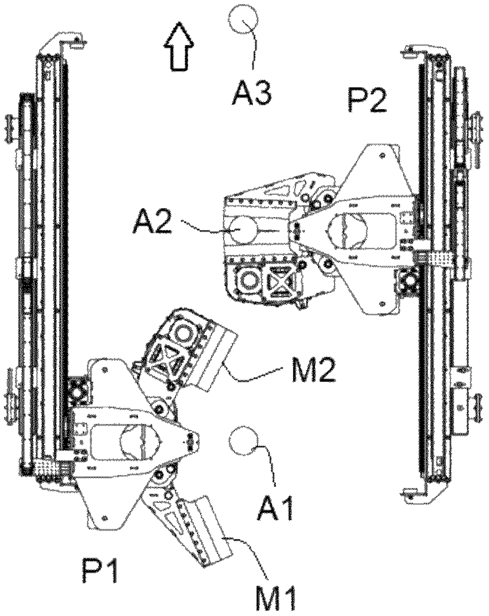
Fig. 9.6
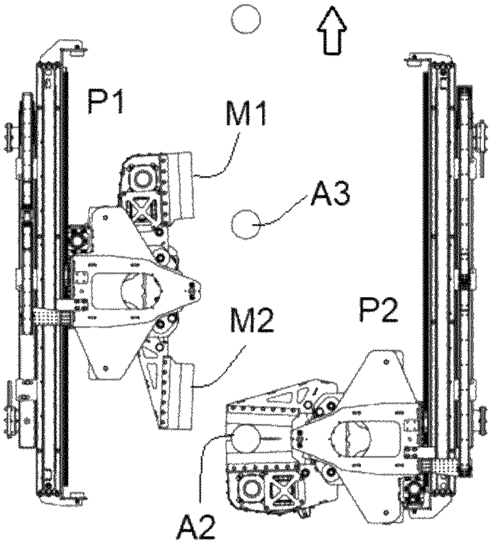
Fig. 9.7
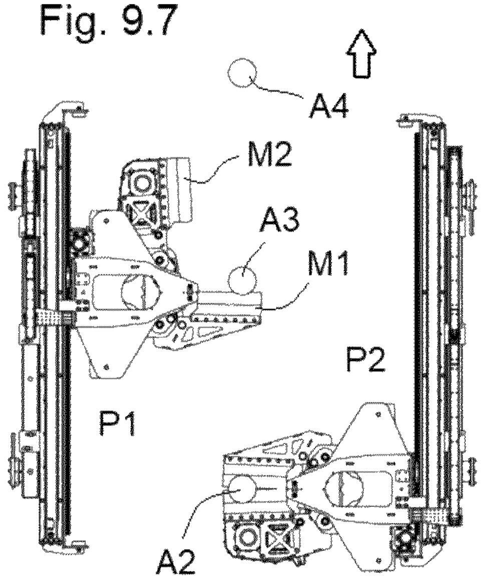
Fig. 9.8
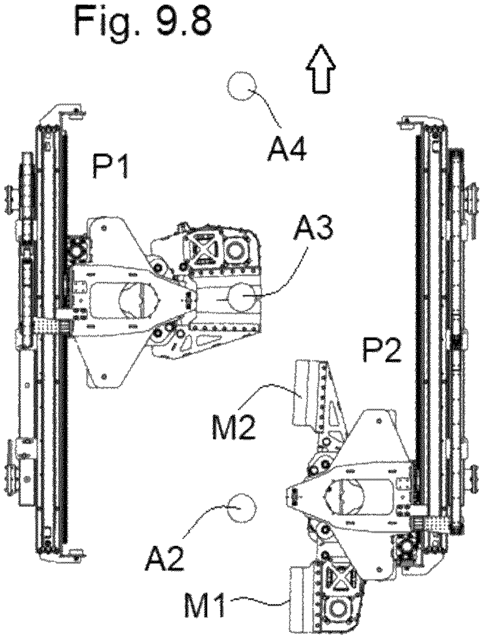

CONTINUOUS VIBRATION DEVICE AND METHOD FOR COLLECTING FRUITS FROM TREES AND BUSHES

CROSS-REFERENCE TO RELATED APPLICATIONS

This this application claims priority to and is a 371 of international PCT Application No. PCT/ES2021/070789 filed on Nov. 3, 2021, the entire contents of which are hereby incorporated by reference.

TECHNICAL FIELD

The invention belongs to the agricultural sector, in the harvesting and collection of fruits from trees or bushes. More specifically, it belongs to the sector of devices for shaking trees or bushes, or for capturing the fruits that are knocked down with these devices.

The object of the invention is an accessory for continuously collecting fruits from trees and bushes using a high-frequency vibration on their trunk.

The invention must be installed on a structure or machine capable of moving astride over the trees, such as for example the multipurpose machine for cultivating trees described in document ES1265465U by the same applicant; so that while the machine bearing this device moves forward continuously, leaving the trees below it, the vibration device will subject the trunk of the trees to an oscillation with a certain wave frequency and amplitude that will cause the ripe fruits to fall on trays or collection belts, all of this continuously, that is, without stopping the forward movement of the machine.

STATE OF THE ART

Fruits from trees and bushes are usually collected in a highly manual way, using very old techniques. In intensive crops of olives, almonds, pistachios or citrus fruits, blankets are spread on the ground or a type of inverted umbrella is placed under the trees and they are vibrated with mechanical harvesters or clamp-type vibration devices. Existing agricultural tractors that bear the vibrating clamp on a deployable arm are designed to work on tree crops along the sides, that is, the tractors move parallel to the line formed by the trees and consequently the vibrating clamp holds the tree at the side.

The process of collecting the fruits from the tree in the current art involves deploying the umbrella or blanket under each tree and then placing the vibrating clamp in front of the trunk, moving the tractor or vehicle bearing it forward up to its height, the clamp reaching the tree, fixing it on the same and vibrating so that the fruits fall onto the tarps or into the collection umbrella. Afterwards, the clamp must release the tree, it must retract, the tractor moved forward, the blanket or umbrella with the fallen fruits removed and then placed again under the next tree. This is the reason why these collection methods are inefficient and have led to the existence of other attempts to achieve continuous collection, that is, where the vibrating machine does not stop until the row of trees to be harvested ends. Some of the following developments can be highlighted:

Document U.S. Pat. No. 4,208,861 describes a mechanical shaker that acts on a row for continuously harvesting horticultural crops and has two oscillating sway bars that vibrate the crops as it moves forward.

Document FR2281056A1 describes a machine hinged on a self-propelled vehicle that is astride by means of supports that are equidistant from the frame of the vehicle. The collecting portion of the machine consists of a horizontal crossbar and two vertical arms, each of which has a set of belts at the bottom that together form large jaws. The contact belts run on rollers and are driven by hydraulic motors in the opposite direction to that in which the machine moves and at a speed related to the speed of the tractor, so that as the machine moves forward straddling the rows of fruit trees, the belts transmit the vibration to the plant, shaking the fruit from the tree.

Document ES2630833 describes a fruit collecting machine made up of two inverted U-shaped gantries, which form an "M" shape when collapsed, which have respective longitudinal frames at the bottom that are located on both sides of the tree when the machine runs astride over the same. On one of the sides, it has a vibrating clamp that, after holding the tree, moves along longitudinal guides, following a predetermined travel in the opposite direction to the movement of the machine, so that this movement occurs in synchrony with the machine, in order for the vibrator to remain in a static position relative to the tree to which it is applied for a period of time established by a timing device associated with said vibrator. This machine achieves a productivity of about 5 bushes/minute, for example when harvesting almond trees, which already represents significant progress; however, it is still a long way from achieving the productivity demanded by large tracts of land planted with almond trees, pistachio trees, olive trees, etc.

Another problem that has been observed in the aforementioned machines is that the vibrating clamp is located at a specific height and, in all cases, it is a conventional clamp with regards to the fact that its jaws open in unison, uniformly separating from the central axis, and the motor causing the vibration is fixed above the clamp. This raises two problems: On the one hand, when the bushes are planted on ridges, as the machine runs along the side rows at a lower level, the clamp either cannot reach the trunk of the tree or it does so at such a low level that it is not appropriate to vibrate the tree at this height due to the possible impact on its roots. However, when it comes to bushes that have very low branching, the clamp holds said bushes above the node, which is also not suitable for the tree nor for achieving effective fruit fall. The second problem is that the vibrating motor usually hits the branches of the bushes (almond or pistachio trees) due to its position above the vibrating clamp, in some cases preventing the tree from being held or from holding it effectively.

Moreover, the machine described in document ES2630833 has bands below its single vibrating clamp that make up a tray or collection belt for the fruits that have fallen from the tree due to vibration. Therefore, these fruits fall on top of the vibration clamp and its entire mechanism, whereby some of them split, while others contribute to clogging this mechanism to a certain extent.

DESCRIPTION OF THE INVENTION

Based on the prior art, and in order to achieve the proposed objectives mentioned in the previous sections, the invention proposes a continuous vibration device for collecting fruits from trees and bushes, which has the features of claim 1.

The continuous vibration device for collecting fruits object of the invention has the special feature that it comprises two frames that are mounted in parallel on both sides of the line of trees or bushes to be harvested, in a machine or implement capable of moving astride above said line of trees or bushes. These frames are placed facing each other so that both can work in unison on the same crop line, each of them vibrating alternate trees, so that at least the productivity of any previous machine existing in the prior state is doubled.

In order to vibrate the trees, each of said frames comprises: at least one longitudinal guide along which skids move for conveying a trolley that bears a vibration clamp, which makes successive passes from the more forward area relative to the machine or implement on which this device is installed, where it waits for the next tree to be vibrated, holds it when it reaches its height due to the forward movement of the machine, vibrates it and, before the tree leaves the space between the longitudinal guides of both frames, releases it and returns to the more forward position to vibrate the next tree, which is not the one following the tree that was just vibrated, since the vibration clamp of the frame placed in front was already in charge of carrying out this task and therefore both clamps alternate in vibration, for which their movements are not synchronised.

To achieve the longitudinal movement of each clamp, a trolley has been provided, which moves along a longitudinal guide alternately from a forward position relative to the movement of the machine or implement on which this device is mounted to another more rearward position. For its part, each vibration clamp fixed on the corresponding trolley comprises a vibration drive motor and opening and closing means for opening and closing two jaws completely independently of each other, so that it is possible, for example, for the more rearward jaw with respect to the forward direction of the machine to close first, waiting for the tree to be vibrated to collide with it before the second more forward jaw closes, or opening both while the trolley returns to the forward position of the linear guide on which it moves.

Another feature of the invention is that each of the trolleys has its own drive motor for its movement along the longitudinal guide; so that the motor only operates to move the trolley forward to the more forward position until the clamp holds the tree that must be vibrated, this, together with the movement of the machine, being that which makes the trolley move backward in a completely free manner to avoid any stress on the device or on the tree.

To enable the simultaneous operation of two vibration clamps, holding or even vibrating two consecutive trees at a given time, it was necessary to develop clamps that were substantially different from the conventional ones that open along their axis simultaneously until forming an approximately 90° angle. The clamps of the invention have two jaws that are driven by respective cylinders and are hinged on the structure of the clamp so that both jaws close and open completely independently, with either of them being aligned and parallel to the line of trees to be harvested when open, and in a position perpendicular to the crop line when closed. Thus, while one clamp is closed holding a tree, the other clamp, for example, is completely open and moving forward to the more forward portion in order to hold the next tree in the crop line.

According to another important feature of the present invention, there is no probe and in order to detect that the machine has reached the height of the next tree to be vibrated, it is envisaged that first the more rearward jaw with respect to the forward direction of the machine in a closed position, so that a sensor detects when the tree strikes it. This sensor can be located on the clamp itself, or on the guide along which the trolley moves in order to detect when said trolley has moved, at which time a control device orders the other more forward jaw to close in order to trap the tree between both jaws of the clamp, which is located in front at that time.

This device allows trees and bushes to be vibrated continuously and without stopping. Its speed will depend on the speed of movement of the machine or implement on which it is installed; in principle, it could be twice that of a conventional machine, but as there is assurance that all the trees have to strike the clamp to carry out the cycle, this speed can be even higher and, moreover, it does not have to be constant and can vary depending on the environment of the terrain. In a first prototype that is being tested, this device reached a productivity of about 12 bushes/minute when harvesting almond trees, but we are sure that it can reach the figure of 18 bushes or more per minute in the short term.

Another feature of the invention lies in the fact that, since the vibrating clamps are no higher than the clamp itself, since their motor is mounted horizontally and does not protrude upward, the bands on which the harvested fruits are collected are placed above the device, whereby the fruits do not interfere with its operation nor are they split or crushed against the moving components of this device, and in practice all the fruits knocked down from the tree are collected and are in perfect condition, which also contributes to the increase in crop productivity.

As already mentioned, this device can be used on any machine or implement that is capable of moving astride above the line of trees or bushes to be harvested; however, the machine described in document ES1265465U by the same applicant is ideal for attaching this device to the same, since in the lower portion trays for collecting fruits that have fallen from the tree or belts transporting them to an independent auxiliary trailer can be attached on both sides.

As described in the present invention, it also relates to a method for harvesting the fruits from trees and bushes by means of a vibration device that works continuously, and said harvesting method is also novel and non-obvious to those skilled in the art, or at least it has not been used until now. This method logically resorts to vibrating the trees by means of vibrating clamps and also to having said vibrating clamps work continuously; however, it is the first known reference to two vibrating clamps, working in unison or not, that operate on both sides of the line of trees to be harvested and that vibrate alternate trees in said crop line. This method increases harvest productivity by at least 100% compared to equipment or machines that operate only on one side of the crop line.

As mentioned, the vibration of the trees by both clamps at some point can be performed simultaneously by both vibrating clamps, or it can be performed alternately by one vibrating clamp or the other. This will depend on the length along which said vibrating clamps can move and the forward speed of the machine bearing the device of the invention.

DESCRIPTION OF THE DRAWINGS

As a complement to the description provided herein, and for the purpose of helping to make the features of the invention more readily understandable, the present specification is accompanied by a set of drawings which, by way of illustration and not limitation, represent the following:

FIGS. 9.1 to 9.8 represent a complete operating sequence of this device in plan view.

EMBODIMENT OF THE INVENTION

Figure 1:
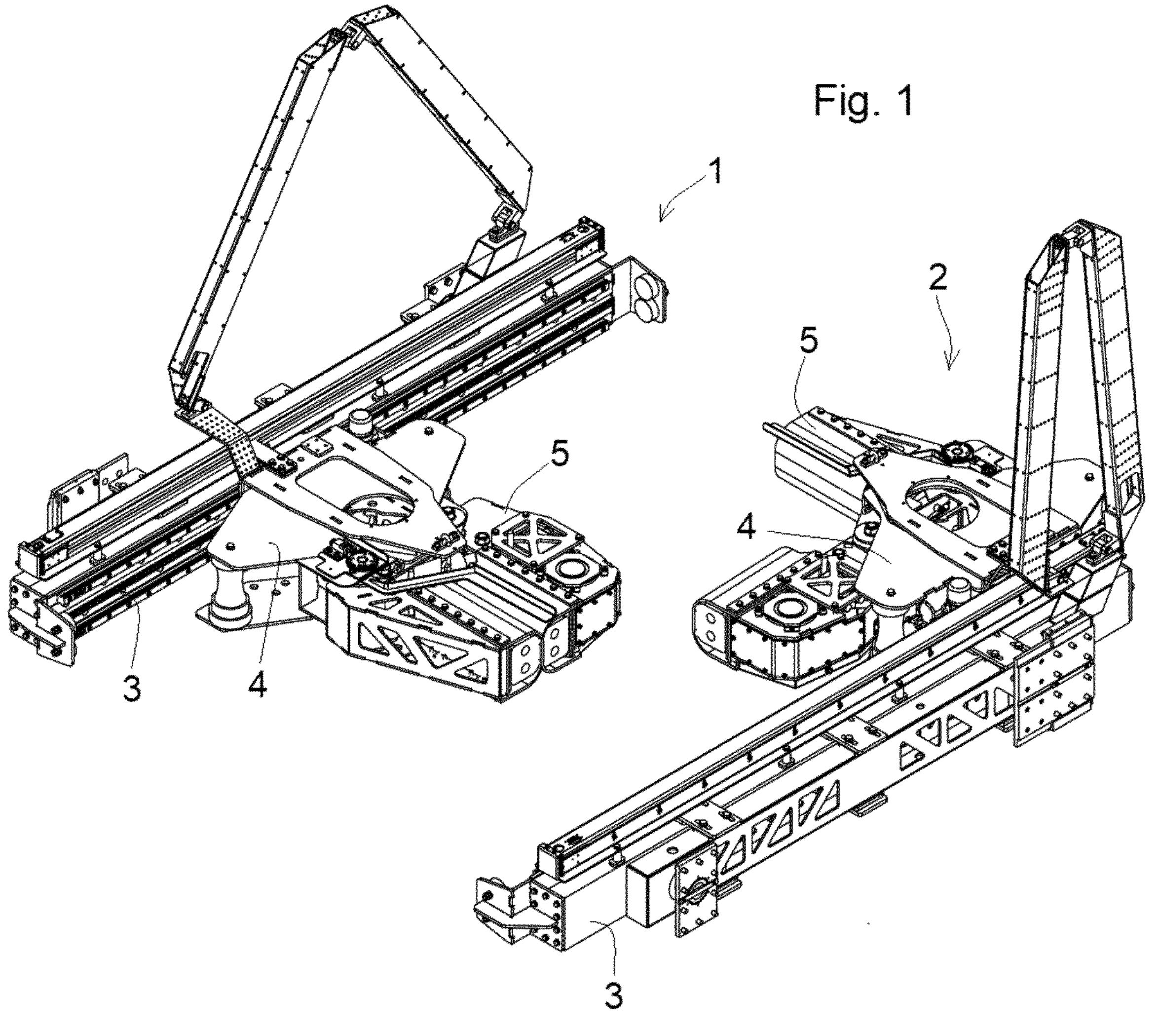
FIG. 1 represents the device of the present invention in a general perspective view.

As shown in FIG. 1, the continuous vibration device for collecting fruits is formed by two frames (1, 2) on each of which a linear guide system (3) having respective vibration clamps (5) that move longitudinally on these frames has been mounted; in such a way that these clamps (5) can open or close their jaws (16) in a certain sequence and transmit the vibration to the trees or bushes located in a line in order to collect their ripe fruits.

Figure 2:
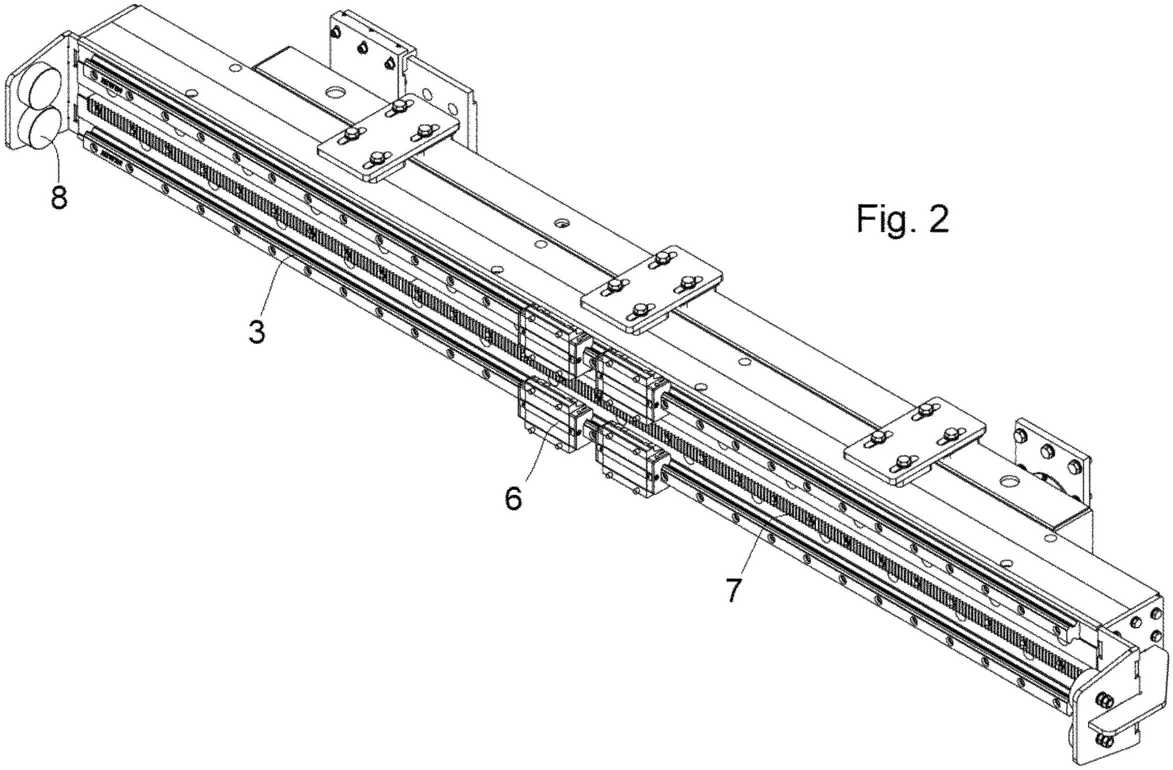
FIG. 2 is a view of one of the guides (3) of this device.

FIG. 2 shows the linear guide system of each frame (1, 2) made up of a rigidly welded structure that defines longitudinal guides (3) that are located parallel to the movement of the device as it moves forward along both sides of a row of trees. Running along said guides (3) are skids (6) that secure the mobile trolley (4) to which the vibration clamps (5) are fastened, in which a pinion (10) that engages with a rack (7) is arranged in order to, by means of a motor (9) arranged in the trolley (4) itself, move the same along the guide (3) on which it is mounted. Rubber stops (8) located at the ends of said guide absorb the possible impacts of the mobile trolley (4) at the end of the travel.

Figure 3:
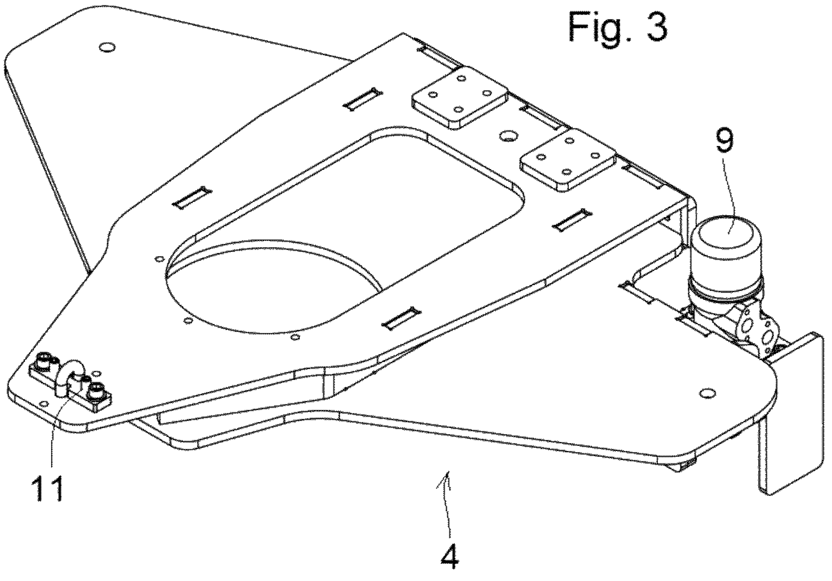
FIGS. 3-4 correspond to respective top and bottom views of one of the trolleys (4) of this device.

FIG. 3 represents the structure of the mobile trolley that is used to move the vibration clamps (5). This trolley is made up of a set of welded parts into which the skids (6) are screwed and the vibration clamp (5) is fixed by means of rubber cylinders (14), which stem-shaft is threaded into the structure of the trolley (4) and by means of a hitch (11) for a front chain (18), in such a way that the clamp (4) is not rigidly attached, but it does not transmit the vibration to the frame or to the machine where the invention is installed.

The clamp (5) also has the peculiarity that the jaws (16) have independent movements, so that each jaw (16) can open or close separately in order to wait for the tree and be able to start the vibration. The jaws are driven by a system of connecting rods moved by a hydraulic cylinder (12, 13), in such a way that the rear jaw can turn by closing at 90°, perpendicular to the line of trees to be harvested, so that it can trap the tree when the machine bearing this device moves forward, and then the more forward jaw closes to hold the tree and start the vibration. Both jaws (16) are opened and aligned, forming an approximate angle of 180° to allow the more rearward clamp to move forward until it passes the other clamp that is vibrating a tree in order to be placed in a waiting position for the next tree in the crop line.

Figure 4:
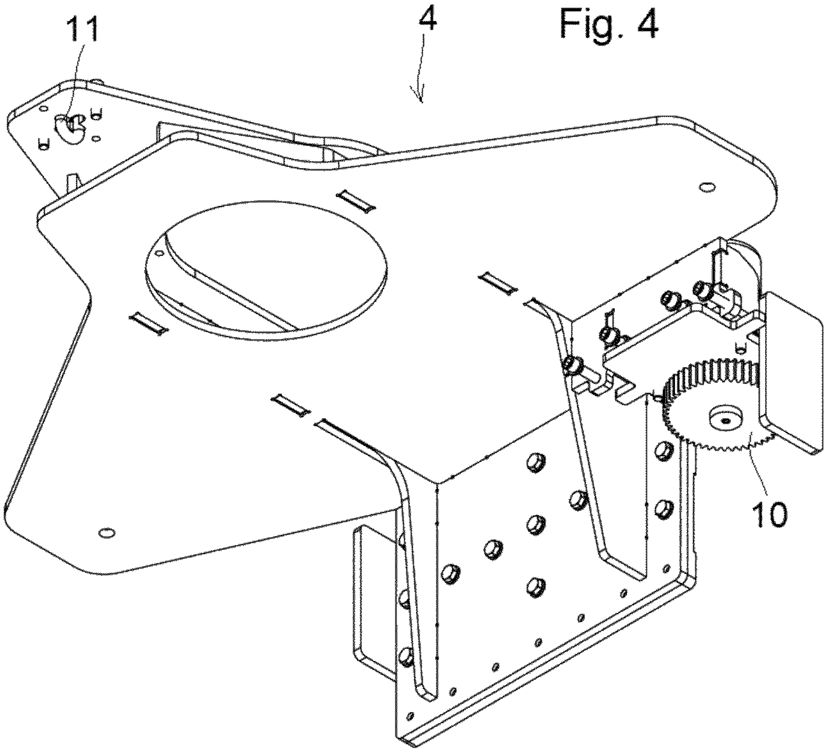
Figure 5:
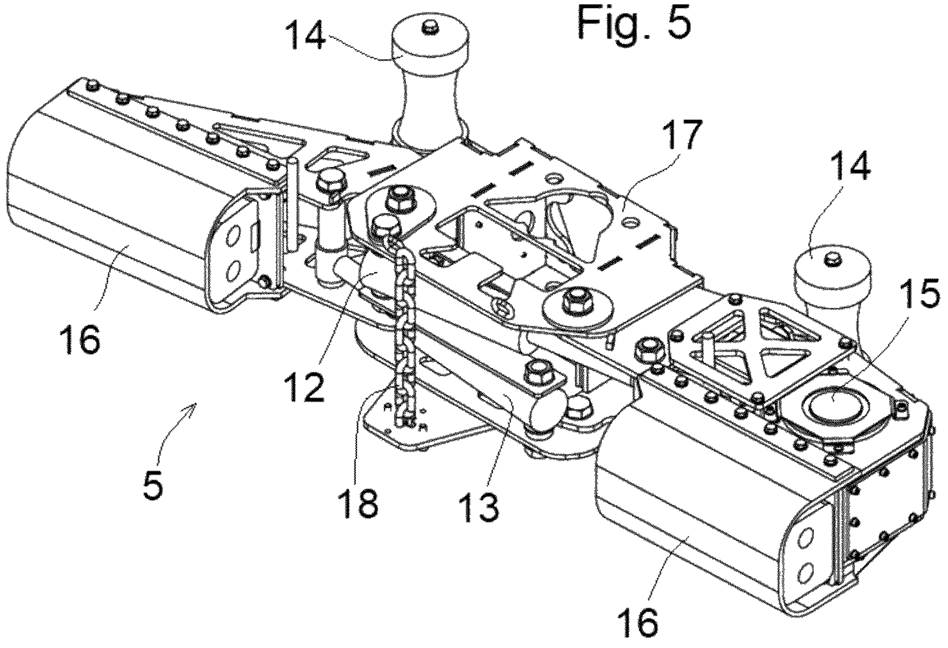
FIGS. 5-7 are views in different positions of one of the clamps (5) of this device.
Figure 6:
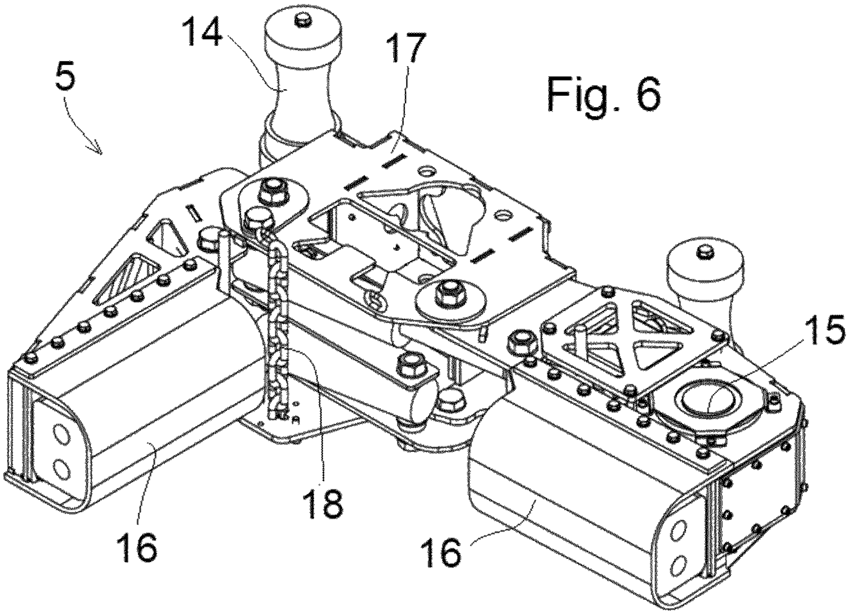

To perform the vibration, one of the jaws incorporates a motor (15) that drives eccentric masses also located on the inside of one of the jaws (16). The frequency of this vibration can be adjusted in speed, weight and rotation inversion, depending on the fruit to be collected. As shown in FIGS. 4-6, the motor (15) is a hydraulic motor that is integrated inside one of the jaws in such a way that the assembly of the clamp (5) in height only has the very height of the holding jaws.

Figure 7:
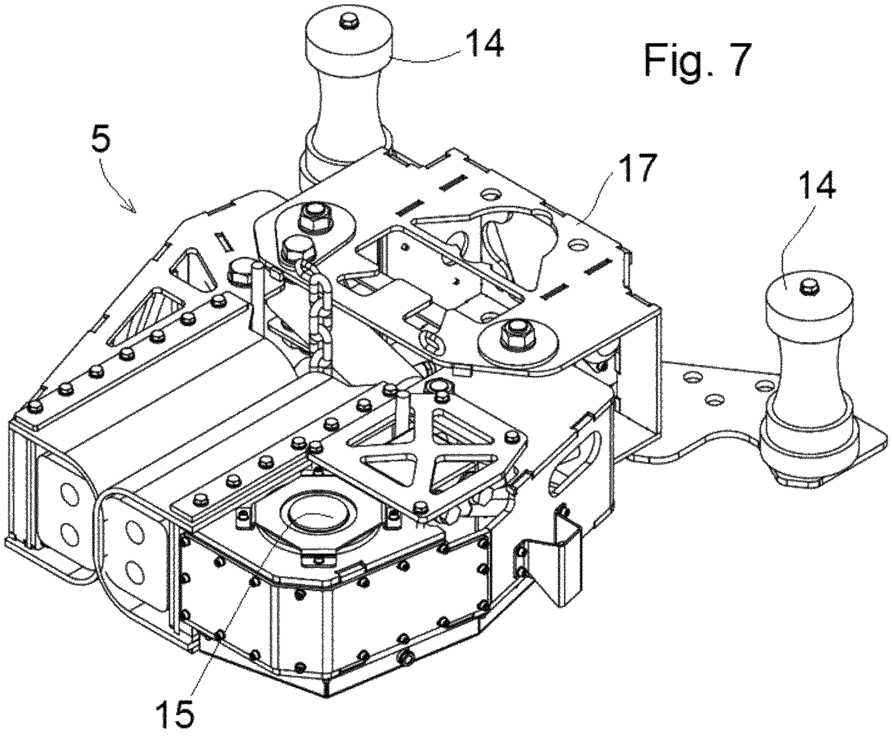

FIGS. 5-7 show isometric views of the vibration clamp (5) in its three main positions: completely open, in a waiting position for the tree to be vibrated, and closed. It should be noted that each of these jaws is made up of rectangular rubber blocks that embrace the tree when it is trapped and prevent damage to the bark.

In FIG. 6, the clamp (5) has one of its jaws (16) perpendicular to the direction of movement of the device, so that when the tree strikes said jaw, a sensor (not shown), either installed on the jaw itself or installed on the guide (3) on which the trolley (4) moves, detects that the tree has struck the jaw or that the trolley (4) has moved, and gives the order to close the other more forward jaw and begin the vibration sequence. This shaking is transferred to the secured tree and the fruit falls in this way. The vibration is completely adjustable, depending on the weights incorporated into the eccentric, the speed of movement and the rotation inversion.

Figure 8:
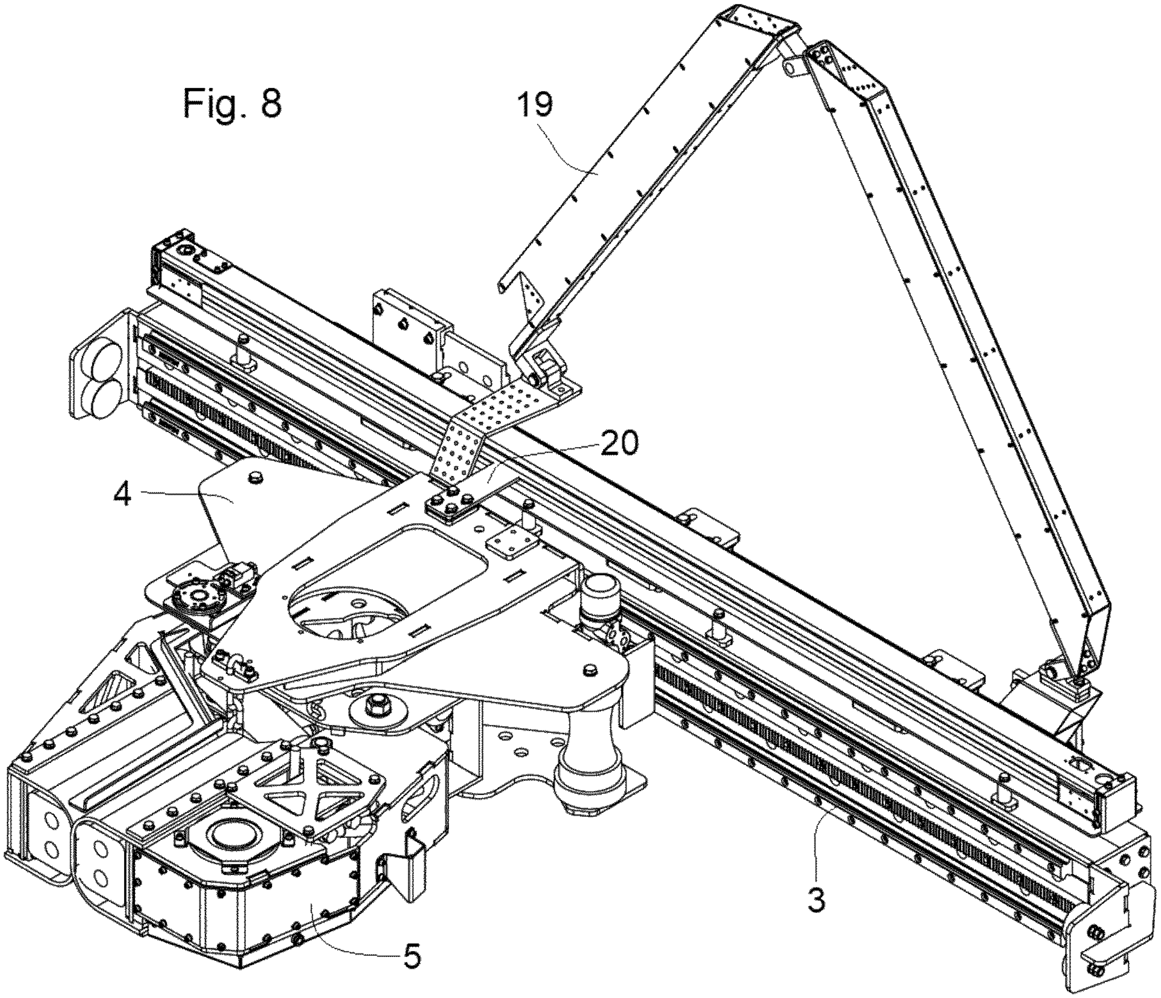
FIG. 8 is a detailed view of one of the frames (1, 2) that make up the device of the invention.

FIG. 8 shows an isometric view that includes one of the complete frames (1, 2), with its guide (3), its mobile trolley (4) and its vibration clamp (5). This image shows the cable and hose scissors (19) that has been developed to connect the hydraulic and electrical elements with the machine or implement on which this device is mounted. These scissors are made up of two pieces joined by a hinge that allows it to rotate as the trolley moves. The figure also shows rails into which sensors (20) are incorporated, which indicate the longitudinal position of each of the mobile trolleys (4) at all times so that there is no collision between both, or between the clamps (5) that each of them bears.

The point of travel of the clamp (5) at which it must stop vibrating the tree and open its jaws (16) can be established by means of a limit switch placed on the corresponding guide (3) or by programming based on the time elapsed in the movement.

Figure 10:
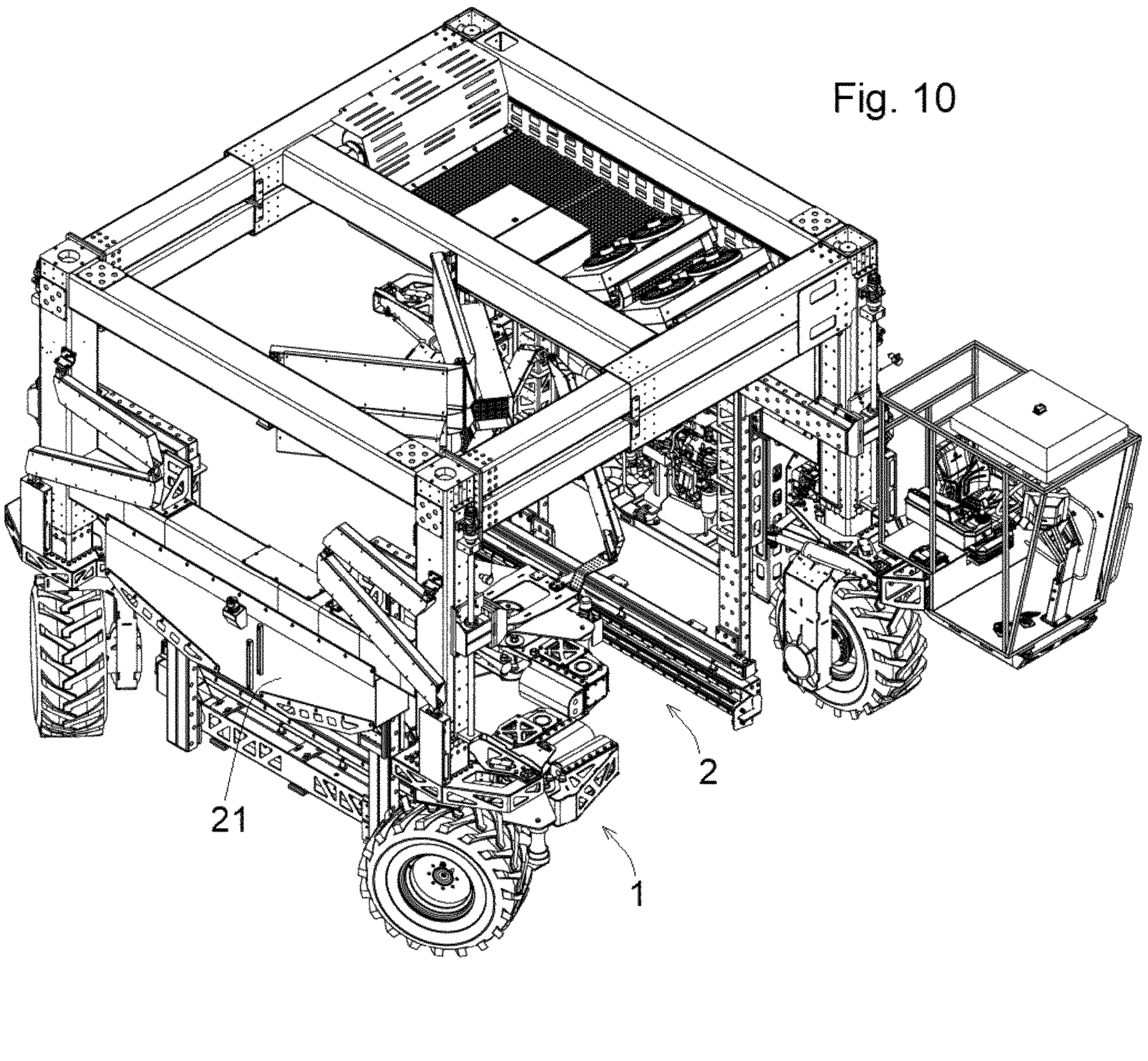
FIG. 10 shows a multipurpose machine for cultivating trees (21) on which the device of the invention has been mounted.

Finally, FIG. 10 shows the continuous vibration device for collecting fruits, mounted on the multipurpose machine described in document ES1265465U, which has been specially designed to work astride over a line of trees or bushes.

The vibration sequence is shown in FIG. 9, which shows how the line of trees is located between the two frames (1, 2) that make up the device of the invention. First, the clamp (P1) located in the more forward position with respect to the forward direction (indicated with an arrow in FIG. 9) has the more rearward jaw (M1) closed until it strikes the first tree to be vibrated (A1). Once this tree has been struck, a sensor detects it and closes the more forward jaw (M2) and the vibration of this tree (A1) begins. Meanwhile, the clamp (P2) located in the more rearward position has its two jaws (M1, M2) open and begins its movement towards the more forward position as its trolley (4) moves along the corresponding guide (3). (See FIGS. 9.1 and 9.2).

Since the forward movement of the device is continuous, the clamp (P1) remains holding the tree (A1) and vibrating it until said tree leaves the space of the device, while the clamp (P2) that already reached the more forward position first closes its more rearward jaw (M1) and once the second tree (A2) strikes it, the more forward jaw (M2) closes on it and begins to vibrate it. (See FIGS. 9.3 and 9.4). In this case, given the proximity between the trees at a given moment, the vibration of two trees occurs at the same time; however, if they were further apart, only one would vibrate at a given time.

When the first clamp (P1) reaches the end of its travel, it opens and releases the tree (A1) that had brought it there while it vibrated said tree. For its part, the second clamp (P2) continues to accompany and vibrate the second tree (A2). (FIG. 9.5).

Next, the first clamp (P1), with its jaws (M1, M2) open, moves to the forward portion of the device, while the second clamp (P2) continues vibrating the tree (A2) (See FIG. 9.6).

FIG. 9.7 shows the more forward clamp (P1) in the same position as at the beginning, arranged to receive a third tree (A3), while the clamp (P2) continues vibrating the tree (A2) or is about to release it and open its jaws (M1, M2) to be able to return to the forward position without hitting the clamp (P1) that is pulled in the opposite direction by the tree (A3). (See FIG. 9.8).

This cycle repeats itself indefinitely, without a single tree to be vibrated remaining in the crop line. Depending on the planting pattern, it will be necessary to adjust the return speed of both clamps (P1, P2) so that they do not collide with each other, since the forward speed while they vibrate the corresponding tree is equal to the forward speed of the device or the machine that supports it. The sensors (20) measure the position of the two clamps at all times and if they enter the impact area, the device would open both clamps and, if necessary, it would stop.

Having described the nature of the invention, as well as a preferred exemplary embodiment, it is obvious that the invention is industrially applicable in the indicated sector.

Likewise, it is hereby stated for all appropriate purposes that the materials, shape, size, and arrangement of the described elements can be modified, provided that this does not entail altering the essential features of the invention claimed below:

The invention claimed is:

1. A continuous vibration device for collecting fruits from trees and/or bushes, the continuous vibration device comprising:

- respective frames, mounted in parallel and facing each other on both sides of the line of trees and/or bushes to be harvested, in a machine or implement capable of moving astride above said line of trees or bushes, wherein each of said frames comprises:
  - at least one longitudinal guide along which skids move for conveying a trolley that bears a vibration clamp move,
  - said trolley, that bears said vibration clamp, which moves alternately from a forward position relative to the movement of the machine or implement on which said device is mounted to another more rearward position, while the vibration clamp is holding a tree and is subjecting same to vibration, and returns to the forward position in a case that the tree is beyond a possible travel of said trolley along the longitudinal guide, and
  - said vibration clamp that has securing means on the trolley, a vibration drive motor and opening and closing means for opening and closing two jaws completely independent of each other, so that in a case that the more rearward jaw with respect to the forward direction of the machine closes first, waiting for the tree to be vibrated to collide with it before the second more forward jaw closes, or opening both while the trolley returns to the forward position of the longitudinal guide on which it moves.

2. The continuous vibration device, according to claim 1, wherein each of the trolleys has a drive motor that causes its movement along the longitudinal guide, moving a pinion that engages with a rack parallel to said guide, the motor acting only in the direction that moves the trolley to the more forward position until the vibration clamp holds the tree that must be vibrated, said tree, together with the movement of the machine or implement on which the device is mounted, being that which makes the trolley move backward until the vibration clamp releases the tree in cultivation.

3. The continuous vibration device, according to claim 2, wherein the two jaws that make up each of the clamps are driven by respective cylinders and are hinged on the structure of the clamp, so that both jaws close and open completely independently, with either of them being aligned and parallel to the line of trees to be harvested when open, and in a position perpendicular to the crop line when closed.

4. The continuous vibration device, according to claim 3, comprising a sensor that detects when the next tree in the line that is being harvested strikes the jaw that is more rearward with respect to the forward direction of the machine, which is in a closed position, at which time a control device orders the other more forward jaw to close in order to trap the tree between both jaws of the clamp that is in front of the clamp of the adjacent frame.

5. The continuous vibration device, according to claim 4, comprising sensors mounted on the guide that indicate the position of each of the mobile trolleys at all times in order to determine the moment of opening the two jaws of the clamp located in the more rearward position with respect to the forward direction of the machine, or so that collision does not occur between both clamps.

6. The continuous vibration device, according to claim 5, wherein each of the vibration clamps mounts on one of its jaws, a motor that drives eccentric masses that produce the vibration necessary for the fruit to fall from the tree that is held by the clamp; said motor being inserted horizontally into the rear of said jaw.

7. The continuous vibration device, according to claim 6, wherein each of the vibration clamps is secured by its rear to its corresponding trolley by means of rubber cylinders, while in the front it is fastened by a cable or chain, so that they float on the mobile trolley so as to not transmit vibrations to the frames or to the machine on which said device is installed.

8. The continuous vibration device, according to claim 7, comprising harvested fruit collection bands that are located above the device so that the fruits are collected without interfering with its operation.

9. A method for harvesting the fruits from trees and bushes, wherein the vibration is performed by means of said continuous vibration device according to claim 1 formed by two vibrating clamps, arranged on both sides of the line of trees to be harvested, which vibrate alternate trees in said crop line.

10. The method, according to claim 9, wherein the vibration of the trees by both clamps at some point is performed simultaneously by both vibrating clamps.

11. The method, according to claim 9, wherein the vibration of the trees by both clamps is performed alternately by one vibrating clamp or the other.

* * * * *